United States Patent [19]

Carleton et al.

[11] 4,388,873
[45] Jun. 21, 1983

[54] RAILROAD VEHICLE

[75] Inventors: John V. Carleton, Lansing, Ill.; Nick Nenadic, East Chicago, Ind.

[73] Assignee: Union Tank Car, East Chicago, Ind.

[21] Appl. No.: 259,279

[22] Filed: Apr. 30, 1981

[51] Int. Cl.³ .................. B61D 7/12; B61D 39/00; B65D 45/24

[52] U.S. Cl. ................................. 105/377; 220/314; 220/324; 292/257; 292/258; 292/259 R

[58] Field of Search ............... 105/377; 220/314, 324, 220/325; 292/259, 256.5, 257, 258

[56] References Cited

U.S. PATENT DOCUMENTS

| | | | |
|---|---|---|---|
| 1,894,657 | 1/1933 | Willoughby | 220/325 |
| 2,660,752 | 12/1953 | Carcereny | 220/324 X |
| 2,930,305 | 3/1960 | Sullivan | 220/324 X |
| 4,000,703 | 1/1977 | Halliar | 105/377 |
| 4,040,363 | 8/1977 | Walk et al. | 105/377 |
| 4,126,094 | 11/1978 | Zimmerle et al. | 105/377 |
| 4,132,327 | 1/1979 | Van Dyke et al. | 105/377 X |
| 4,248,160 | 2/1981 | Carney, Jr. et al. | 105/377 |
| 4,307,670 | 12/1981 | Nadherny | 105/377 |

*Primary Examiner*—Robert B. Reeves
*Assistant Examiner*—Howard Beltran
*Attorney, Agent, or Firm*—Dressler, Goldsmith, Shore, Sutker & Milnamow, Ltd.

[57] ABSTRACT

A closed railroad hopper car for solid commodities is loaded through hatches at its top. A pivoted lid or cover on each hatch is held shut by a single quick-acting cam lever. A catch prevents pressure in the car from throwing the hatch cover open when the tension from the cam lever is released. The hatch cover cannot be opened until after the cam lever is moved transversely out of contact with the catch.

6 Claims, 4 Drawing Figures

U.S. Patent     Jun. 21, 1983     4,388,873
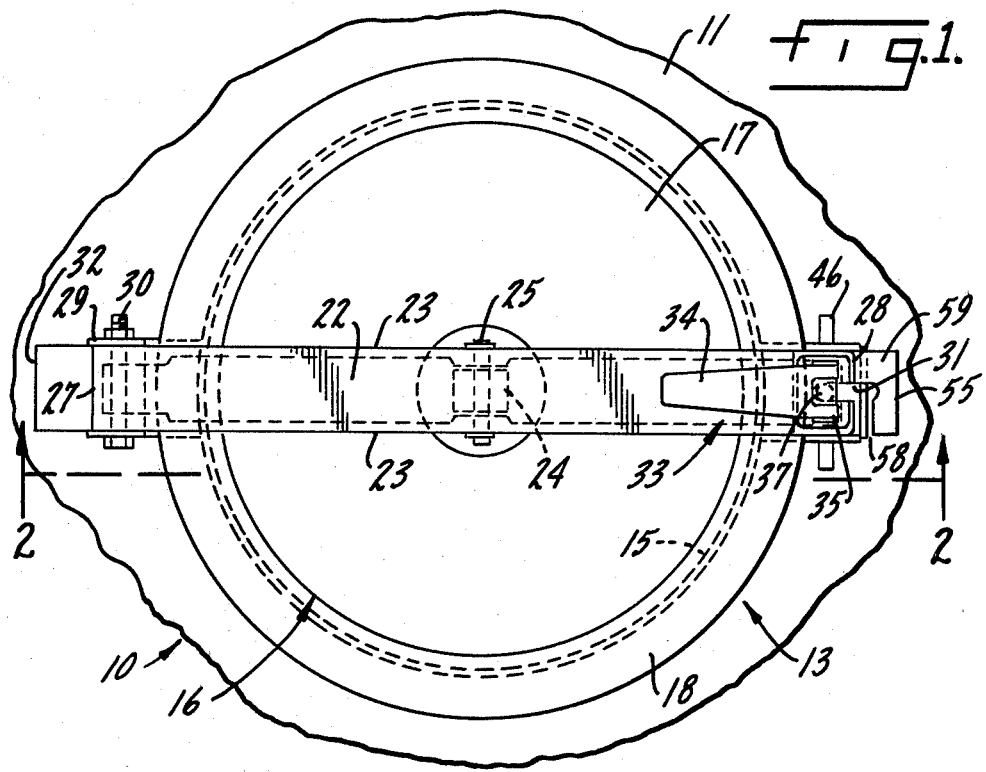
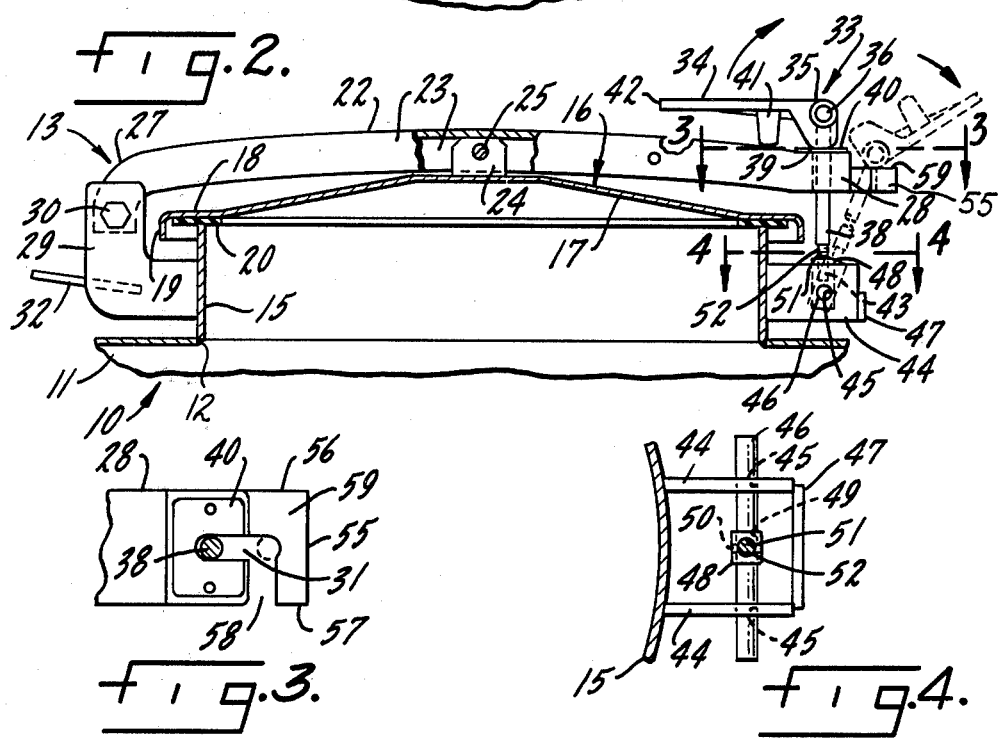

4,388,873

RAILROAD VEHICLE

BACKGROUND OF THE INVENTION

This invention relates to large vessels for storing or transporting various commodities, and more particularly to hatches through which railroad cars are loaded.

Hatches are used to close the inlet openings at the top of transportation vehicles and storage containers. Such hatches may have a cover that is pivoted at one end and held in closed position by a quick release latch at its other end. Sometimes pressure builds up inside such vehicles and containers, and such internal pressure can cause violent blow-off of the hatch cover and the snap-back of the latch mechanism when a workman opens the hatch.

OBJECTIVES OF THE INVENTION

Accordingly, it is an object of this invention to provide an improved hatch for closed vessels.

Another object is to provide a safety catch for pivotable hatch covers that prevents the covers from being thrown open suddenly by internal pressure in a container.

Another object is to provide an adjustable latch for holding hatch covers in closed position.

Another object is to provide a quick-opening hatch that can be vented to release pressure in a container without being blown open.

Another object is to provide a railroad hopper car with loading hatches that are safe, rugged, economical, easy to open, close and clean, and which do not possess defects found in similar prior art devices.

Other objects and advantages of the invention will be found in the specification and claims, and the scope of the invention will be set forth in the claims.

BRIEF DESCRIPTION OF THE DRAWING

FIG. 1 is a top plan view of a railroad car having a hatch in accord with the invention.

FIG. 2 is a cross sectional view taken along the line 2–2 in FIG. 1, and showing the engaged position of the latch mechanism in phantom when venting the car.

FIG. 3 is a plan view taken along the line 3—in FIG. 2.

FIG. 4 is a plan view taken along the line 4—4 in FIG. 2.

DESCRIPTION OF A PREFERRED EMBODIMENT

The drawing shows a railroad hopper car 10 having an enclosed body or container 11 for holding a commodity, such as pellets of PVC, ABS or other plastics. Container 11 has a plurality of inlet openings 12 through its upper surface for loading commodities. A hatch 13 for each opening 12 has an upstanding cylindrical ring 15 secured to container 11 around each opening 12. Ring 15 extends upwardly above the upper surface of container 11. A generally circular cover 16 is located above ring 15 for closing the opening 12. Cover 16 has a domed central portion 17 to promote drainage, a flat edge portion 18, and a peripheral flange 19. A flat gasket 20, made from a resilient material such as neoprene, may be used to seal the underside of edge portion 18 against the upper surface of ring 15. An elongated handle 22 having separated side portions 23 is attached to the top of cover 16 at the center of the handle and cover. A lug 24 secured to and extending above the upper surface of cover 16 is pivotally attached to handle 22 by a cylindrical pin 25 that passes through aligned circular holes in side portions 23 and lug 24. The opposite ends of handle 22 project beyond the periphery of cover 16. A hinge 29 secured to ring 15 has a pin 30 that pivotally connects one end 27 of handle 22 to the ring so that cover 16 is pivotable toward and away from ring 15 to close and open container 11. The other end 28 of handle 22 is bifurcated by a longitudinal slot 31. A stop plate 32 on hinge 29 prevents cover 16 from being pivoted all the way toward container 11, thereby preventing handle 22 from striking the container or the feet of a workman.

A latch 33 for holding cover 16 in its closed position sealed against ring 15 includes a cam lever 34 having one end 35 pivotally attached by a pin 36 to the upper end 37 of a connecting link 38. Lever 34 has a cam surface 39 on its under side. When lever 34 is pivoted toward handle 22, surface 39 bears against a wear plate 40 that defines the upper surface of handle 22 adjacent slot 31. A stop 41 that projects from the underside of lever 34 is spaced from cam surface 39 toward the other end 42 of the lever. Stop 41 prevents the underside of lever 34 from contacting handle 22 except at surface 39 and thereby protects workmen from being pinched between the lever and handle. The other end 43 of link 38 is pivotally attached to ring 15 by means of a pair of lugs 44 that are secured at one end to ring 15 and project outwardly therefrom. Circular holes 45 in lugs 44 are aligned, and a cylindrical rod 46 extending transversely of handle 22 is received in holes 45. The opposite ends of rod 46 project a substantial distance beyond lugs 44, and rod 46 is rotatable in holes 45 and slidable laterally in holes 45. A bar 47 connects the outer ends of lugs 44. A member 48 located between lugs 44 has a circular hole 49 therethrough. Rod 46 passes through hole 49, and means, such as set screw 50, attaches member 48 to the center of rod 46. Member 48 has a tapped hole 51, and the opposite threaded end 52 of link 38 is screwed into hole 51. Thus, link 38 is pivotable toward and away from handle 22 longitudinally of the handle, and movable transversely of handle 22 with rod 46 between lugs 44. Link 38 is receivable in slot 31, and this brings lever 34 into position for sealing cover 16 closed by tensioning link 38 as lever 34 is pivoted toward handle 22. The effective length of link 38 can be adjusted by threading the link into or out of hole 51 member 48. This permits adjustment of the camming force exerted by lever 34 for clamping cover 16 in its closed position.

Internal pressure in container 11 is prevented from causing uncontrolled opening of cover 16 by a safety catch 55 that projects beyone end 28 of handle 22. Catch 55 is attached to handle 22 at one end 56 and is separated from the handle at its other end 57 so as to define a transversely extending notch 58. Slot 31 and notch 58 merge with each other. As shown in FIG. 2, catch 55 engages lever 34 and prevents cover 16 from being opened when link 38 is positioned in slot 31 and the lever and link are pivoted away from handle 22. The only way in which cover 16 can be opened is for link 38 to be moved transversely of handle 22 out of notch 58; this moves lever 34 out of engagement with catch 55 and allows handle 22 and cover 16 to pivot away from the lever. The upper surface 59 of catch 55 is spaced vertically below the upper surface of wear plate 40. This permits cover 16 to be opened a slight amount that vents the pressure in container 11 when lever 34 is gradually pivoted into engagement with catch 55.

It has thus been shown that by the practice of this invention an improved hatch 13 for railroad hopper cars 10 can be opened and closed quickly and easily by disengaging or by engaging a single lever-actuated latching mechanism 33. Internal pressure in the car is prevented from blowing cover 16 open uncontrollably by a safety catch 55; this prevents injury to workmen and to the car body. And by spacing upper surface 59 of catch 55 below the upper surface of handle 22, the pressure in container 11 can be gradually and safely released. The tension on handle 22 holding cover 16 closed can be adjusted or controlled by threading link 38 into or out of member 48.

While the present invention has been described with reference to a particular embodiment, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. A hatch for a vessel holding a commodity under pressure, comprising:
   A. a ring having an upper surface surrounding an opening through said vessel, said ring extending upwardly beyond the upper surface of said vessel;
   B. a hatch cover above said ring having an underside for closing said opening, gasket means sealing the underside of said cover against the upper surface of said ring;
   C. an elongated handle attached to the top of said cover, opposite ends of said handle projecting beyond the periphery of said cover, hinge means connecting one end of said handle to said ring so that said cover is pivotable toward and away from said ring to close and open said hatch, there being a longitudinal slot in the other end of said handle;
   D. means for latching said cover in closed position against said ring comprising a cam lever having one end pivotally attached to one end of a connecting link, means attaching the other end of said link to said ring in such a manner that said link is pivotable toward and away from said handle longitudinally of said handle and in such a manner that said link is movable transversely of said handle, said link being receivable in said slot in said handle, a cam surface on an underside of said lever for bearing against an upper surface of said handle adjacent said slot when said link is received in said slot and said lever is pivoted toward said handle, whereby said link is tensioned so as to hold said cover in closed position; and
   E. means for venting pressure in said vessel and preventing sudden opening of said cover, comprising a safety catch projecting beyond said other end of said handle, said catch being attached at one end to said handle, said catch having an upper surface spaced below an upper surface of the handle said handle at its other end so as to define a notch that extends transversely of said handle, said notch merging into said slot forming an angular configuration, said catch engaging said lever when said link is in said slot and said link and said lever are pivoted away from said handle, said lever being disengagable from said catch for pivoting of said hatch to its fully open position only after said link is moved transversely of said handle out of said notch, the upper surface of said catch is spaced vertically below said upper surface of said handle adjacent said slot, whereby when a portion of the cam surface of said lever is pivoted into engagement with said catch said cover may pivot open a slight amount and thereby vent pressure in said vessel.

2. The invention defined in claim 1, further comprising means spaced from said cam surface and projecting from the underside of said lever for preventing the underside of said lever from contacting said handle except at said cam surface.

3. The invention defined in claim 1, further comprising stop means attached to said hinge for preventing said cover from being pivoted until said handle can contact said vessel.

4. The invention defined in claim 1, wherein threads on said other end of said link mate with threads in said means attaching said link to said ring so that the effective length of said link can be adjusted by threading said link into and out of said attaching means, whereby the camming pressure exerted by said lever can be adjusted.

5. The invention defined in claim 1, wherein said means attaching said link to said ring comprises a pair of lugs attached at one end to said ring and projecting therefrom, there being aligned circular holes in said lugs, a cylindrical rod received in said holes and extending transversely of said handle, the end of said rod projecting beyond said lugs, said rod being rotatable and being slidable in said holes, a member located between said lugs having a hole therethrough receiving said rod, means releasably attaching said member to said rod, said member having a tapped hole therein, and said other end of said link being threaded into said tapped hole.

6. A railroad vehicle comprising:
   A. an enclosed container for holding a commodity under pressure, said container having an opening in its upper surface for loading said commodity, a cylindrical ring surrounding said opening, said ring extending upwardly beyond said upper surface of said container;
   B. a generally circular cover having an underside above said ring for closing said opening, an annular gasket sealing the underside of said cover against the upper end of said ring;
   C. an elongated handle secured to the top of said cover, opposite ends of said handle projecting beyond the periphery of said cover, a hinge connecting one end of said handle to said ring so that said cover is pivotable toward and away from said ring to close and open said container, there being a longitudinal slot in the other end of said handle;
   D. a latch for holding said cover in closed position against said ring comprising a cam lever having one end pivotally attached to one end of a connecting link, the other end of said link being threaded, means pivotally attaching said other end of said link to said ring comprising a pair of lugs attached at one end to said ring and projecting outwardly therefrom, there being aligned circular holes in said lugs, a cylindrical rod received in said holes and extending transversely of said handle, the ends of said rod projecting beyond said lugs, said rod being rotatable and being slidable in said holes, a member located between said lugs having a hole therethrough receiving said rod, means releasably attaching said member to said rod, said member having a tapped hole therein, said other end of said link being threaded into said tapped hole, said link being pivotable toward and away from said handle longitudinally of said handle and said link and rod being movable transversely of said handle, said link being receivable in said slot in said handle, a cam surface on the underside of said lever for bearing against the upper surface of said handle adjacent said slot when said link is received in said slot and said lever is pivoted toward said handle, whereby said link is tensioned so as to hold said cover in closed position; and E. means for venting pressure in said container and preventing sudden opening of said cover comprising a safety catch projecting beyond said other end of said handle, said catch being attached at one end to said handle, said catch having an upper surface spaced below an upper surface of said handle at is other end so as to define a notch that extends transversely of said handle, said notch merging with said slot, forming an angular configuration, said catch engaging said lever when said link is in said slot and said link and said lever are pivoted away from said handle, said lever being disengagable from said catch for pivoting said cover to its opened position only after said link is moved transversely of said handle out of said notch, the upper surface of said catch being spaced vertically below said upper surface of said handle adjacent said slot, whereby when a portion of the cam surface of said lever is pivoted into engagement with said catch said cover may pivot open a slight amount and thereby vent pressure in said container.

* * * * *